US011201868B2

(12) United States Patent
Davydov et al.

(10) Patent No.: US 11,201,868 B2
(45) Date of Patent: Dec. 14, 2021

(54) SYSTEM AND METHOD FOR ADJUSTING THE BEHAVIOR OF AN APPLICATION BASED ON THE DRM STATUS OF THE APPLICATION

(75) Inventors: Alexander Davydov, Helsinki (FI); Balazs Godeny, Helsinki (FI); Kimmo Loytana, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1870 days.

(21) Appl. No.: 11/585,437

(22) Filed: Oct. 23, 2006

(65) Prior Publication Data
US 2008/0097922 A1 Apr. 24, 2008

(51) Int. Cl.
*G06Q 20/00* (2012.01)
*H04L 29/06* (2006.01)
*G06F 21/10* (2013.01)

(52) U.S. Cl.
CPC ............. *H04L 63/10* (2013.01); *G06F 21/10* (2013.01); *H04L 2463/101* (2013.01)

(58) Field of Classification Search
CPC ............ G06Q 2220/10; G06Q 2220/14; H04L 63/10; H04L 2463/101; G06F 21/10
USPC ............................................. 705/59, 16, 71
See application file for complete search history.

(56) References Cited

U.S. PATENT DOCUMENTS

| 7,065,507 | B2 * | 6/2006 | Mohammed et al. | 705/59 |
| 7,076,211 | B2 * | 7/2006 | Donner | H04Q 9/00 340/506 |
| 7,313,824 | B1 * | 12/2007 | Bala et al. | 726/27 |
| 7,835,992 | B2 * | 11/2010 | Meyer et al. | 705/59 |
| 2002/0032664 | A1 | 3/2002 | Ikuta | |
| 2003/0191719 | A1 * | 10/2003 | Ginter | G06F 21/10 705/54 |
| 2003/0233549 | A1 * | 12/2003 | Hatakeyama et al. | 713/170 |
| 2004/0127196 | A1 * | 7/2004 | Dabbish et al. | 455/411 |
| 2004/0148523 | A1 * | 7/2004 | Lambert | 713/201 |
| 2004/0249768 | A1 * | 12/2004 | Kontio | G06F 21/10 705/65 |
| 2004/0267645 | A1 | 12/2004 | Pollari | |
| 2005/0004875 | A1 * | 1/2005 | Kontio et al. | 705/52 |
| 2005/0021995 | A1 | 1/2005 | Lal et al. | |
| 2005/0070257 | A1 * | 3/2005 | Saarinen et al. | 455/414.1 |

(Continued)

FOREIGN PATENT DOCUMENTS

| EP | 1154384 A2 | 11/2001 |
| EP | 1526427 A2 | 4/2005 |

(Continued)

OTHER PUBLICATIONS

International Search Report for PCT Application No. PCT/IB2007/053461.

(Continued)

*Primary Examiner* — Dante Ravetti
(74) *Attorney, Agent, or Firm* — Alston & Bird LLP

(57) ABSTRACT

A system and method by which an application is capable of accessing its own DRM information stored in a content-agnostic DRM system. By being able to access its own DRM information, the application is able to improve the overall user experience by, among other things, making DRM-related information available to the user and providing potential options to the user which may not have been previously available.

18 Claims, 4 Drawing Sheets

(56) References Cited

U.S. PATENT DOCUMENTS

| | | |
|---|---|---|
| 2005/0091168 A1 | 4/2005 | Gunyakti et al. |
| 2005/0093989 A1* | 5/2005 | Imai .......................... 348/222.1 |
| 2005/0097052 A1* | 5/2005 | Systa ..................... G06F 21/10 705/51 |
| 2005/0182956 A1* | 8/2005 | Ginter .................... G06F 21/10 713/193 |
| 2005/0216419 A1* | 9/2005 | Lee et al. ....................... 705/59 |
| 2005/0262568 A1* | 11/2005 | Hansen .................. G06F 21/10 726/26 |
| 2005/0268343 A1* | 12/2005 | Onoda et al. ................... 726/26 |
| 2005/0268346 A1* | 12/2005 | Lee ......................... G06F 21/10 726/27 |
| 2005/0278787 A1* | 12/2005 | Naslund et al. ................ 726/26 |
| 2006/0010498 A1* | 1/2006 | Oh et al. ....................... 726/26 |
| 2006/0080351 A1* | 4/2006 | Powell .................... G06F 21/10 |
| 2006/0085534 A1* | 4/2006 | Ralston et al. ................ 709/223 |
| 2006/0140144 A1* | 6/2006 | Bruner et al. ................. 370/328 |
| 2006/0143179 A1* | 6/2006 | Draluk et al. ..................... 707/9 |
| 2006/0149550 A1* | 7/2006 | Salminen ................ G06F 9/451 704/270.1 |
| 2006/0174347 A1 | 8/2006 | Davydov et al. |
| 2006/0205385 A1* | 9/2006 | Davydov ................ G06F 21/10 455/411 |
| 2007/0006327 A1* | 1/2007 | Lal et al. ......................... 726/31 |
| 2007/0038576 A1* | 2/2007 | Lee ................................. 705/59 |
| 2007/0088837 A1* | 4/2007 | Gidron et al. ............... 709/228 |
| 2007/0094276 A1* | 4/2007 | Isaac ............................ 707/100 |
| 2007/0156855 A1* | 7/2007 | Johnson .............. G06F 17/3002 709/219 |
| 2007/0174490 A1* | 7/2007 | Choi ..................... G06F 16/958 709/246 |
| 2007/0272105 A1* | 11/2007 | Burgess .............. B41F 27/1206 101/477 |
| 2008/0066181 A1* | 3/2008 | Haveson et al. ................. 726/26 |
| 2008/0228574 A1* | 9/2008 | Stewart ............. G06Q 30/0273 705/14.69 |
| 2008/0282357 A1* | 11/2008 | Sharpe ................... G06F 21/10 726/27 |
| 2009/0083857 A1* | 3/2009 | Ueno et al. ..................... 726/26 |
| 2009/0217036 A1* | 8/2009 | Irwin et al. .................. 713/168 |

FOREIGN PATENT DOCUMENTS

| | | |
|---|---|---|
| WO | WO 2005/093989 | 10/2005 |
| WO | WO 2006/095247 | 9/2006 |

OTHER PUBLICATIONS

Office Action for European Application No. 07826180.7 dated Apr. 13, 2015.

Extended European Search Report for European Application No. 07826180.7 dated Feb. 4, 2013.

International Preliminary Report on Patentability (Chapter II) for Application No. PCT/IB2007/053461 dated Sep. 30, 2008, 5 pages.

* cited by examiner

SYSTEM AND METHOD FOR ADJUSTING THE BEHAVIOR OF AN APPLICATION BASED ON THE DRM STATUS OF THE APPLICATION

FIELD OF THE INVENTION

The present invention relates generally to Digital Rights Management (DRM) protection of applications. More particularly, the present invention relates to the protection of Java Mobile Information Device Profile (MIDP) applications, also referred to as MIDlets, using Open Mobile Alliance (OMA) DRM technology.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

OMA DRM is a technology that allows control over the consumption of various media objects, such as ring tones, images, and other objects such as applications, by mobile terminals. DRM is a term used to describe a range of techniques that use information about rights and rights holders to manage copyright material and the terms and conditions on which the material is made available to users. More specifically, DRM involves the description, layering, analysis, valuation, trading, and monitoring of an owner's property rights to an asset. DRM covers the management of the digital rights to the physical manifestation of a work (e.g., a textbook) or the digital manifestation of a work (e.g., an Internet web page).

Therefore, OMA DRM is a content-agnostic DRM technology that can be used to protect MIDlets from illegal use. This protection takes the form of ensuring (via the DRM agent—a software component residing in the mobile terminal) that a MIDlet is used in accordance with the usage rules formulated by the MIDlet provider. In OMA DRM, these rules are expressed using a special language and are placed in a "Rights Object," which is securely stored in the mobile terminal, separately from the MIDlet being protected. By formulating usage rules, the MIDlet provider can impose various restrictions on the way the MIDlet is used. For example, if so desired, MIDlet usage can be restricted such that it is only executable within a specified time period, only after a specified date, or only a limited number of times. The DRM agent in the mobile terminal then enforces these restrictions.

One issue that arises when DRM protection is applied to application is that of the user experience. Applications are different from other types of content (i.e., images, videos, etc.) that can be protected using DRM technologies. This is due to the fact that applications can be considered to be "active" content, as they can change their behavior depending on various circumstances. For example, an application that requires network connectivity can detect that the network is unavailable and inform the user, thus achieving an improved user experience.

In the case of OMA DRM protection of Java MIDP applications, there is currently no standard way for a MIDlet to obtain information about the own DRM status. Therefore, MIDlet developers are not able to achieve a smooth user experience by providing the user with information on the DRM status of MIDlets.

As one example where a poor user experience exists, a MIDlet provider may restrict the number of MIDlet executions to two occurrences—to allow the user a preview of the application. However, a situation can easily arise where a user does not know about the restriction (in particular about the number of allowed executions) and therefore uses both executions without properly trying out the MIDlet. This poor user experience would not have to happen if the MIDlet was capable of displaying DRM information in the MIDlet's user interface (UI). Alternatively, some software programs are occasionally provided to a user on a "trial" basis—for thirty or sixty days, for example. In such cases, a user could, without prior notice, suddenly find himself or herself without access to the program once the trial period has expired.

Currently, there is no standard method for a Java MIDP application to access its own DRM status. A DRM agent currently uses the application's DRM information to enforce rules, for example, not to permitted execution after a specified time. However, since this enforcement (and related UI notifications to the user) happens "outside" of the MIDlet UI and outside of the control of the MIDlet's developer, the result is poor user experience or even a UI break, i.e., a native prompt interrupting the MIDlet UI.

It would therefore be desirable to develop a system where an application's behavior can be adjusted based upon its DRM status.

SUMMARY OF THE INVENTION

The present invention provides for a system and method by which an application is capable of accessing its own DRM information stored in a content-agnostic DRM system, such as an OMA DRM system. By being able to access its own DRM information, the application is able to improve the overall user experience by, among other things, making DRM information available to the user and providing potential options to the user which may not have been previously available.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF EXEMPLARY EMBODIMENTS

Figure 1:
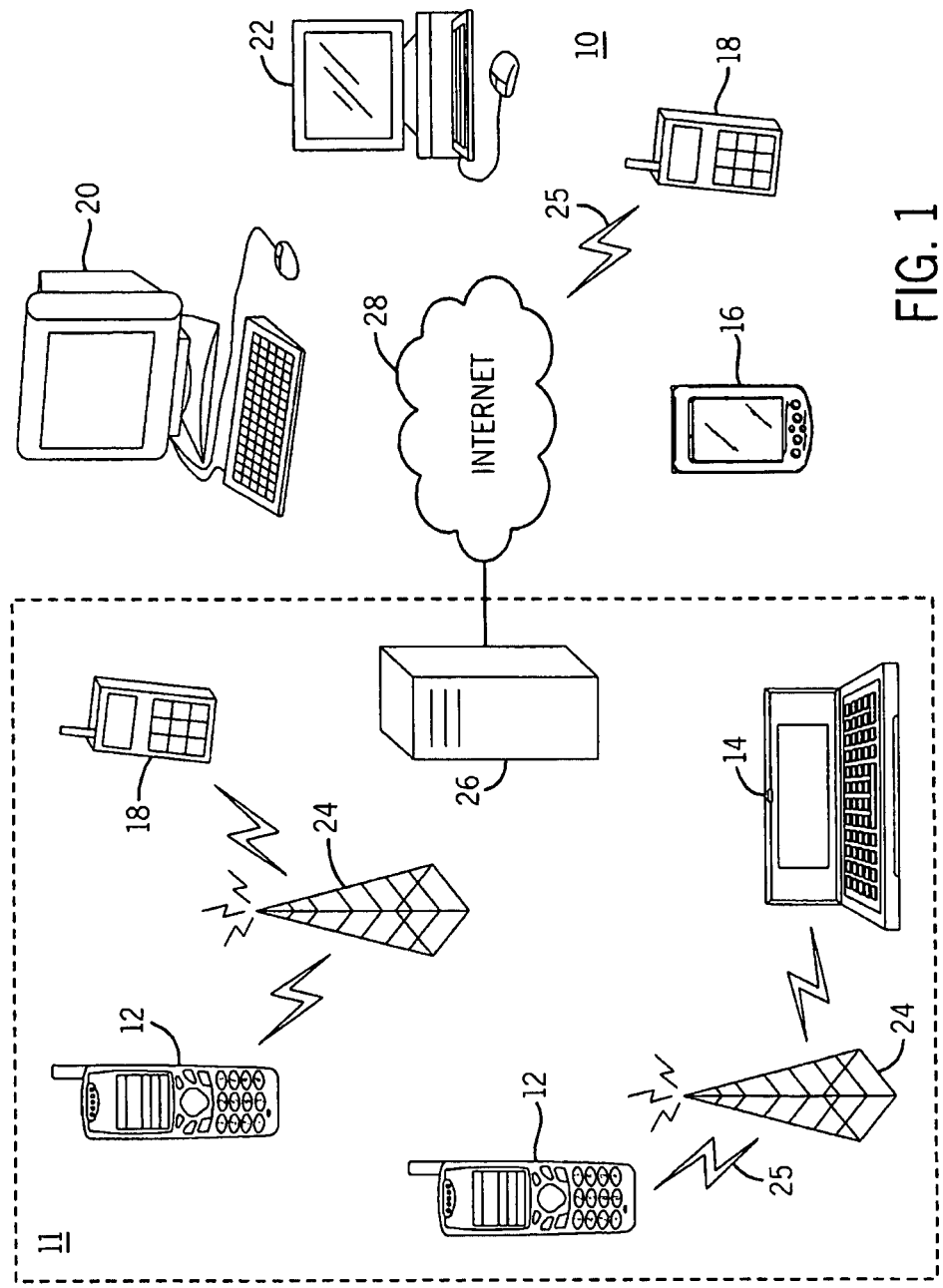
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination personal digital assistant (PDA) and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
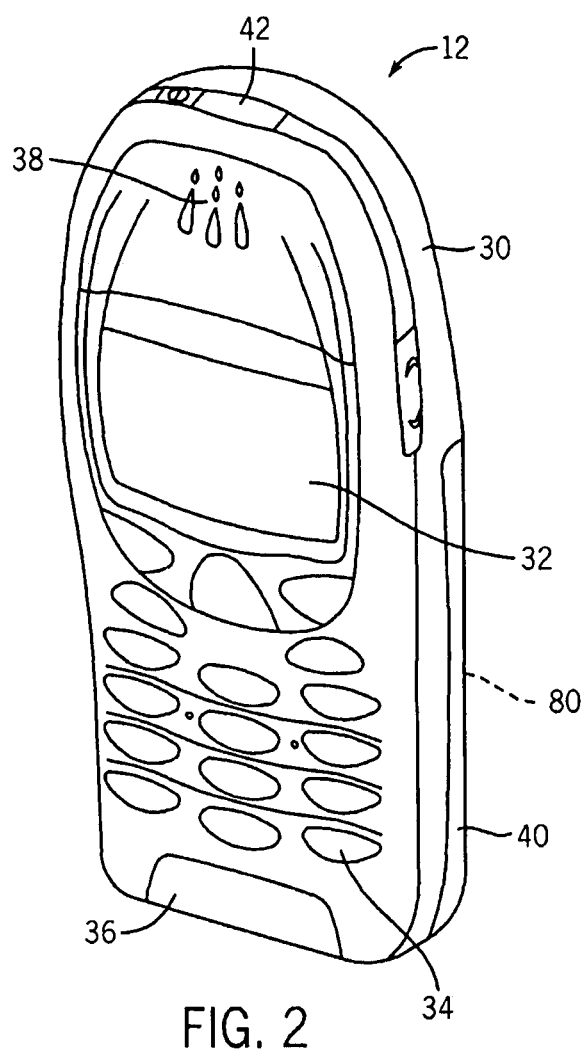
FIG. 2 is a perspective view of a mobile telephone that can be used in the implementation of the present invention.
Figure 3:
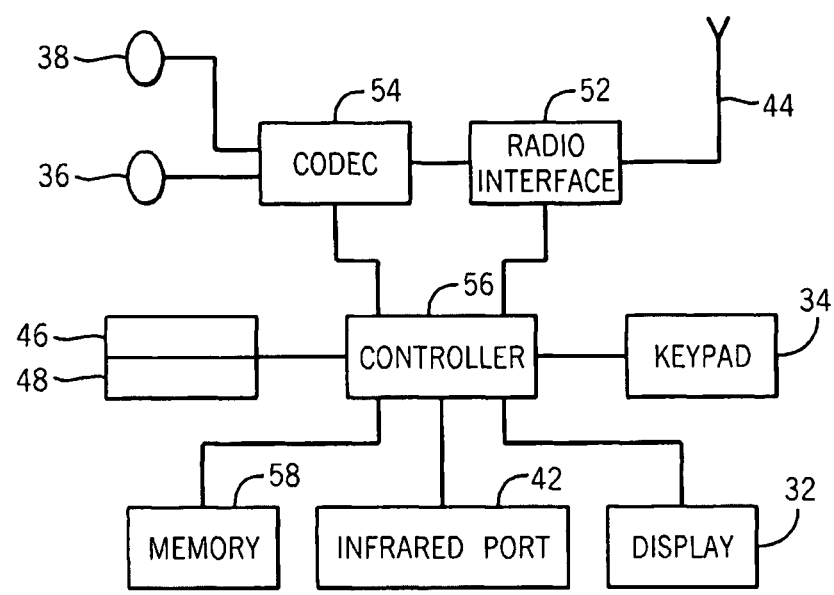
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention provides for a system and method by which an application is capable of accessing its own DRM information stored in a content-agnostic DRM system, such as an OMA DRM system. By being able to access its own DRM information, the application is able to improve the overall user experience by, among other things, making DRM information available to the user and providing potential options to the user which may not have been previously available.

Figure 4:
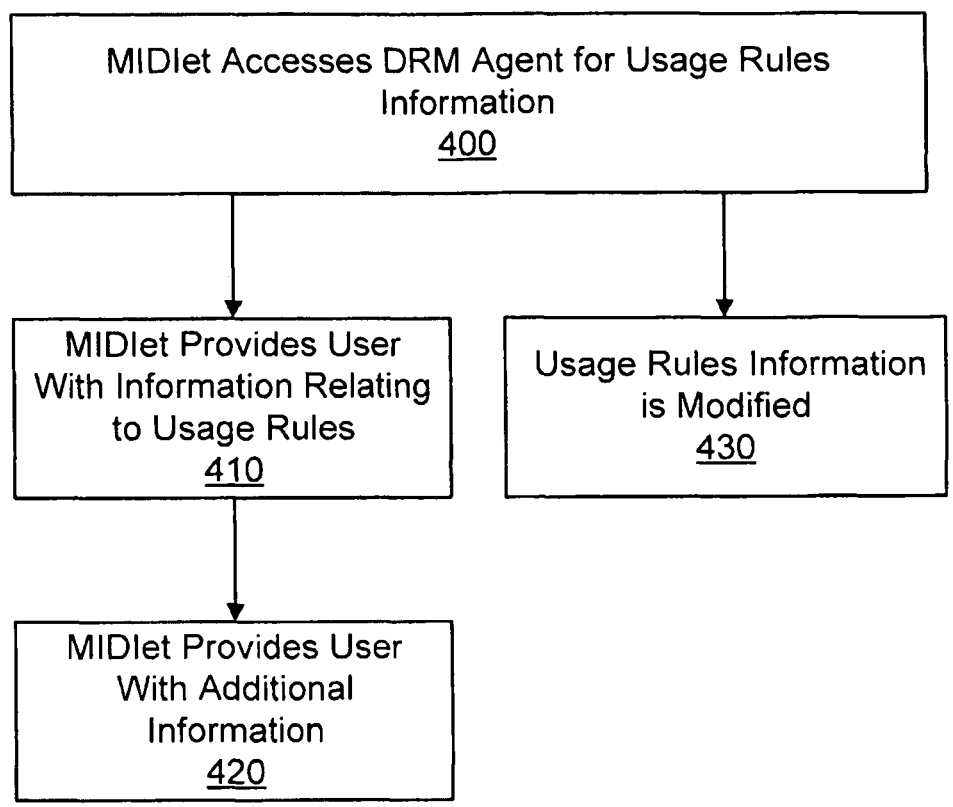
FIG. 4 is a flow chart showing a process by which various embodiments of the present invention may be implemented.

FIG. 4 is a flow chart showing the implementation of one embodiment of the present invention. At 400 in FIG. 4, a DRM-aware MIDlet accesses a DRM agent for usage rules information. The MIDlet and/or the DRM agent can be located, for example, within the memory 58 of a mobile telephone. The usage rules information accessed in the DRM agent can take a variety of forms. For example, the DRM agent can include information such as a period of time during which the MIDlet may or may not be executed. The DRM agent may also contain a date and/or time before or after which the MIDlet may or may not be executed. Still further, the DRM agent may include an indication as to how many times the MIDlet may be executed in the future. The usage rules information in the DRM agent can be accessed and used by the MIDlet developer in different embodiments. The interaction with the MIDlet can occur through the use of an application program interface (API) such as a Java API. The API typically comprises a set of routines, protocols and other tools that serve as "building blocks" for software applications. The API used with the various embodiments of the present invention can be proprietary to a single company, part of an industry standard, or of another form. In terms of industry standards, one such API is a Java Industry Standard Java Specification Request (JSR) API, for example the JSR 300 DRM API currently being standardized. In another embodiment, a MIDlet that possesses a proper authorization (e.g., via signing) can alter its own usage rules.

At 410, the MIDlet at least selectively provides the user with information relating to the usage rules information that has been obtained from the DRM agent. This information is provided to the user through the MIDlet's user interface. Although the information may often be provided in visual form, it is also possible that non-visual mechanisms, such as audio, could be used to inform the user of the usage rules information. The information that is provided to the user can take a variety of forms. For example, the user could be informed that the MIDlet may only be executed a certain number of times, or the user could be informed of a date or time after which the MIDlet will no longer be executable. Information may be provided in other forms as well. For example, if there is a date after which the MIDlet will no longer be available, a countdown timer could be exhibited via the user interface indicating how much time is left before the MIDlet will no longer be available. Additionally, it should also be noted that the circumstances under which the information is provided can be limited or restricted. For example, if a software program has a 60 day trial program, then it is possible that a notice of the expiration date may not be provided until the final ten days of the trial period. In such a situation, the providing of information is more selective in nature.

At 420 in FIG. 4, the MIDlet may also provide additional information to the user relating to DRM usage rules. For example, if there are only a certain number of permitted executions of the MIDlet remaining, then the MIDlet may provide the user with information regarding how to obtain additional DRM rights. This information can take a variety of forms. For example, the MIDlet can provide the user with a rights issuing service URL, a telephone number and/or other contact information for obtaining the additional rights. The information provided at 420 can be stored both in the MIDlet and/or in the DRM agent. It should be noted that this providing of additional information is depicted in FIG. 4 as occurring after the usage rules information is provided by the MIDlet, these two actions may also occur simultaneously or in the opposite order.

In another embodiment of the present invention, in addition to reading its own DRM information, the MIDlet can also modify this DRM information in the DRM agent under certain circumstances. For example, the mobile terminal may authenticate a MIDlet (by checking a cryptographic signature) as coming from a trusted source and thus authorize this MIDlet to alter its own DRM status. In one such use case, if a user purchases additional usage rights from the MIDlet provider, then the MIDlet could receive information regarding this payment and be permitted to modify the information in the DRM agent to reflect the newly-purchased usage rights. The concept of modifying the usage information is depicted at 430 in FIG. 4.

In addition to the above, it should be understood that information in addition to "standard" DRM information can be included by a MIDlet provider for accessing by the MIDlet at a later time in certain embodiments of the invention. For example, a MIDlet provider can place certain additional values along with "standard" usage rules, with these values being interpreted by the MIDlet as execution parameters. The MIDlet can therefore modify its own behavior in view of these values.

As a result of the above process, MIDlets can provide a user with a better user experience when DRM technology is involved, as certain unpleasant "surprises" can be avoided and a user can be provided with important usage rules information.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    storing, on a device, at least an application that is executable on the device, a usage rules information file associated with the application, and a digital rights management (DRM) agent;
    authenticating, by the DRM agent, that the application is from an authorized source by checking a cryptographic signature;
    accessing, by the application, the usage rules information file associated with the application from the DRM agent, through an application programming interface (API) of the DRM agent;
    reading, by the application, the usage rules information file associated with the application;
    presenting, via at least the application, information relating to the accessed usage rules information file to a user through a user interface of the application;
    presenting, via at least the application, information relating to purchase options of additional usage rights for the application to the user through a user interface of the application;
    receiving a user input selecting a presented purchase option of additional usage rights for the application;
    authorizing, by the DRM agent, the application to alter the stored usage rules information file for the application;
    modifying, by the application, the stored usage rules information file for the application to reflect newly-purchased usage rights; and
    enforcing, by the DRM agent, the modified usage rules information file on the device to restrict or allow access to the application.

2. The method of claim 1, wherein accessing by the application further comprises accessing by a Java Mobile Information Device Profile (MIDP) application.

3. The method of claim 1, wherein accessing the usage rules information further comprises accessing information regarding a time period within which the application may be used;
    wherein the usage rules information file is provided according to Open Mobile Alliance Digital Rights Management technology. and stored on the device separately from the application.

4. The method of claim 1, wherein accessing the usage rules information further comprises accessing information regarding a number of times that the application may be executed.

5. The method of claim 1, wherein accessing the usage rules information further comprises accessing information regarding a specified time after which the application may be used.

6. The method of claim 1, wherein accessing through the DRM agent further comprises accessing through an Open Mobile Alliance (OMA) DRM agent.

7. The method of claim 1, wherein accessing the usage rules information further comprises accessing the usage rules information by a Java application programming interface (API) through the DRM agent.

8. A non-transitory computer-readable medium comprising logic, the logic operable, when executed on a processor, cause the processor to:
    store, on a device, at least an application that is executable on the device, a usage rules information file associated with the application, and a digital rights management (DRM) agent;
    authenticate, by the DRM agent, that the application is from an authorized source by checking a cryptographic signature;
    access, by the application, the usage rules information file associated with the application from the DRM agent, through an application programming interface (API) of the DRM agent;

read, by the application, the usage rules information file associated with the application;
present, via at least the application, information relating to the accessed usage rules information file to a user through a user interface of the application;
present, via at least the application, information relating to purchase options of additional usage rights for the application to the user through a user interface of the application;
receive a user input selecting a presented purchase option of additional usage rights for the application;
authorize, by the DRM agent, the application to alter the stored usage rules information file for the application;
modify, by the application, the stored usage rules information file for the application to reflect newly-purchased usage rights; and
enforce, by the DRM agent, the modified usage rules information file on the device to restrict or allow access to the application.

9. An apparatus, comprising:
a memory unit operable to store executable code; and
a processor communicatively connected to the memory unit and operable to execute the executable code to cause the apparatus to perform:
  storing, on the apparatus, at least an application that is executable on the apparatus, a usage rules information file associated with the application, and a digital rights management (DRM) agent;
  authenticating, by the DRM agent, that the application is from an authorized source by checking a cryptographic signature;
  accessing, by the application, the usage rules information file associated with the application from the DRM agent, through an application programming interface (API) of the DRM agent,
  reading, by the application, at least a portion of the usage rules information file associated with the application;
  presenting, by the application, information relating to the accessed usage rules information file to a user through a user interface of the application;
  presenting, by the application, information relating to purchase options of additional usage rights for the application to the user through a user interface of the application;
  receiving a user input selecting a presented purchase option of additional usage rights for the application;
  authorizing, by the DRM agent, the application to alter the stored usage rules information file for the application;
  modifying, by the application, the stored usage rules information file for the application to reflect newly-purchased usage rights; and
  enforcing, by the DRM agent, the modified usage rules information file on the device to restrict or allow access to the applicaton.

10. The apparatus of claim 9, wherein accessing by the application further comprises accessing by a Java Mobile Information Device Profile (MIDP) application.

11. The apparatus of claim 9, wherein accessing the usage rules information further comprises accessing information regarding a time period within which the application may be used;
  wherein the usage rules information file is written in a language different from the application and stored on the device separately from the application.

12. The apparatus of claim 9, wherein accessing the usage rules information further comprises accessing information regarding a number of times that the application may be executed.

13. The apparatus of claim 9, wherein accessing the usage rules information further comprises accessing information regarding a specified time after which the application may be used.

14. The apparatus of claim 9, wherein accessing through the DRM agent further comprises accessing through an Open Mobile Alliance (OMA) DRM agent.

15. The apparatus of claim 9, wherein accessing the usage rules information further comprises accessing the usage rules information by a Java application programming interface (API) through the DRM agent.

16. The method of claim 1, further comprising:
  via the API of the DRM agent, providing the user, via the user interface of the MIDP application, information regarding how to perform at least one of obtaining or extending DRM rights.

17. The non-transitory computer-readable medium of claim 8, wherein the logic, when executed on the processor, is further configured to:
  via the API of the DRM agent, provide the user, via the user interface of the MIDP application, information regarding how to perform at least one of obtaining or extending DRM rights.

18. The apparatus of claim 9, wherein the processor is further operable to:
  via the API of the DRM agent, provide the user, via the user interface of the MIDP application, information regarding how to perform at least one of obtaining or extending DRM rights.

* * * * *